United States Patent
Gagor et al.

(10) Patent No.: US 11,035,468 B2
(45) Date of Patent: Jun. 15, 2021

(54) GASKET FOR A TIMING CHAIN TENSIONER

(71) Applicant: Federal-Mogul Motorparts, LLC, Southfield, MI (US)

(72) Inventors: Bartosz Jozef Gagor, Northlake, IL (US); Steven Kueltzo, Aurora, IL (US); Rich Larson, Des Plaines, IL (US); Tae Kim, Evanston, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 119 days.

(21) Appl. No.: 16/137,793

(22) Filed: Sep. 21, 2018

(65) Prior Publication Data
US 2020/0096108 A1    Mar. 26, 2020

(51) Int. Cl.
*F16J 15/08* (2006.01)
*F16H 7/08* (2006.01)

(52) U.S. Cl.
CPC ............ *F16J 15/0818* (2013.01); *F16H 7/08* (2013.01); *F16H 2007/0812* (2013.01); *F16H 2007/0842* (2013.01)

(58) Field of Classification Search
CPC .............. F16J 15/0818; F16J 15/0831; F16H 2007/0842
See application file for complete search history.

(56) References Cited

U.S. PATENT DOCUMENTS

| 4,757,560 | A | * | 7/1988 | Grimstad | E03D 1/26 277/640 |
| 4,901,681 | A | * | 2/1990 | Pozniak | F02B 75/22 123/184.31 |
| 5,083,801 | A | * | 1/1992 | Okano | F16J 15/061 277/598 |
| 6,231,050 | B1 | * | 5/2001 | Raden | F02F 11/00 123/195 C |
| 7,494,179 | B2 | * | 2/2009 | Deachin | B60R 13/06 156/78 |
| 7,850,055 | B2 | | 12/2010 | Niblett et al. | |
| 8,113,519 | B2 | | 2/2012 | Yoshida | |
| 8,210,544 | B2 | | 7/2012 | Waddell et al. | |
| 8,419,021 | B2 | * | 4/2013 | Mellander | F16J 15/061 277/567 |
| 8,596,645 | B2 | | 12/2013 | Niblett et al. | |
| 8,833,771 | B2 | * | 9/2014 | Lesnau, IV | F16J 15/122 277/591 |

(Continued)

FOREIGN PATENT DOCUMENTS

| JP | 57190736 A | * 11/1982 | ........... F16J 15/0831 |
| JP | 57190738 A | * 11/1982 | ............ B21D 39/03 |

*Primary Examiner* — Eugene G Byrd
(74) *Attorney, Agent, or Firm* — Robert L. Stearns; Dickinson Wright, PLLC

(57) ABSTRACT

The gasket includes a gasket body which is made of a monolithic piece of an elastomeric material. The gasket body has an oil opening for allowing oil to pass between the timing chain tensioner and a cylinder head. The gasket body includes at least one outer engagement feature for directly engaging with an outer wall of the timing chain tensioner to hold the gasket body on the timing chain tensioner. The gasket body also includes at least one inner engagement feature for directly engaging with an inner wall of the timing chain tensioner to further hold the gasket body on the timing chain tensioner.

6 Claims, 5 Drawing Sheets

(56) References Cited

U.S. PATENT DOCUMENTS

| | | | | |
|---|---|---|---|---|
| 8,882,112 B2* | 11/2014 | Allen | ...................... | F16J 15/104 |
| | | | | 277/637 |
| 9,650,990 B2* | 5/2017 | Griffiths | ............... | F16J 15/3268 |
| 10,738,448 B2* | 8/2020 | Swart | ........................ | E03D 1/26 |
| 2005/0012280 A1 | 1/2005 | Richardson | | |
| 2009/0285624 A1* | 11/2009 | Waddell | ................ | F16J 15/061 |
| | | | | 403/14 |
| 2019/0003593 A1* | 1/2019 | Hendzel | ............... | F16J 15/0818 |

* cited by examiner

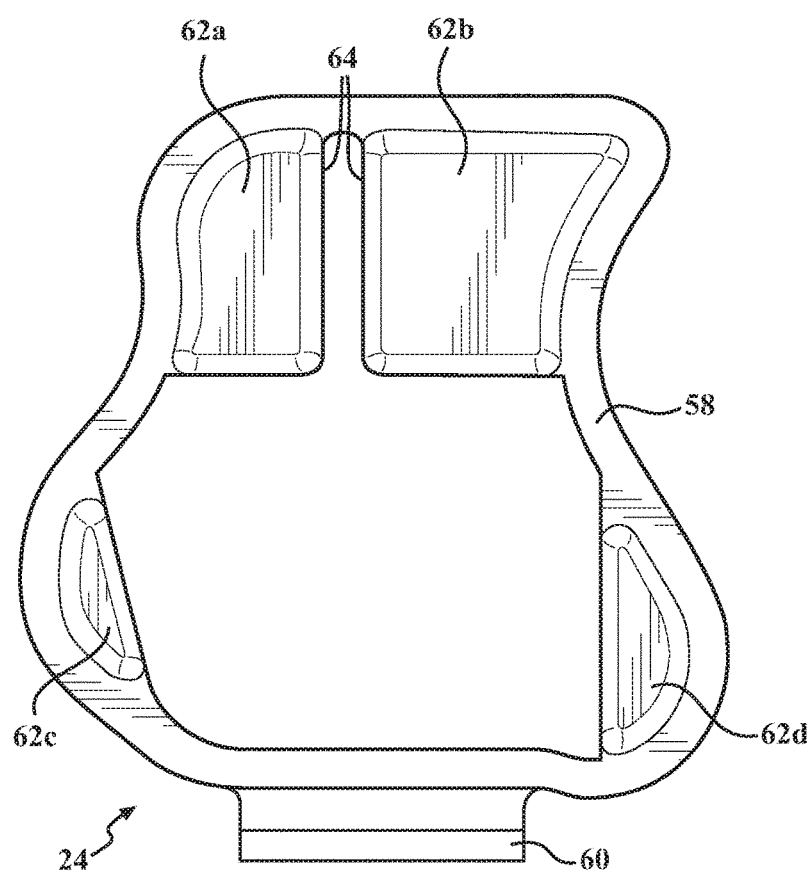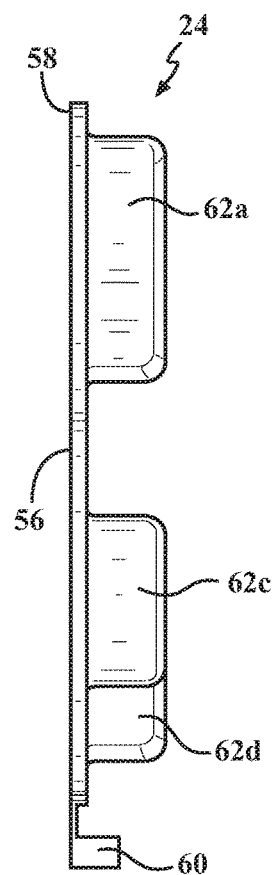
FIG. 3
FIG. 4
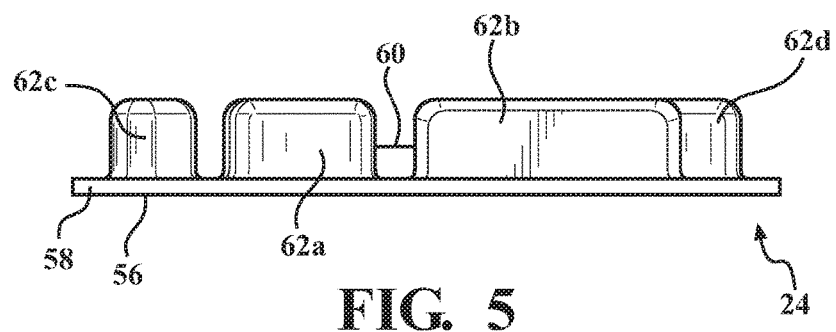
FIG. 5

GASKET FOR A TIMING CHAIN TENSIONER

BACKGROUND OF THE INVENTION

1. Field of the Invention

The present invention is related generally to a gasket for a timing chain tensioner for an internal combustion engine.

2. Related Art

In overhead cam engines, one or more camshafts are mechanically connected with an engine crank shaft via a timing chain. A timing chain tensioner is operatively connected with the timing chain to maintain the timing chain under a predetermined level of tension. The timing chain tensioner is typically activated with oil pressure, and thus, a sealing device is necessary to seal the riming chain tensioner with a cylinder head to prevent the escape of oil.

With reference to FIG. 1, in many original equipment (OE) applications, the sealing device is a bead of room temperature vulcanization (RTV) silicon rubber which is applied to a recessed surface on the timing chain tensioner before it is mated with the cylinder head. Some aftermarket companies offer an alternative solution (not shown) which includes a redesigned timing chain tensioner which has a special groove that is designed to accommodate a special press-in-place gasket.

In situations where the RTV silicon rubber sealing device fails, a customer is forced to choose between either purchasing a replacement OE timing chain tensioner with a new bead of RTV silicon rubber or purchasing the aftermarket timing chain tensioner and its special press-in-place gasket. Either of these options is costly as it requires not just replacing the sealing device but replacing the entire timing chain tensioner, which may otherwise still be operational.

SUMMARY OF THE INVENTION AND ADVANTAGES

One aspect of the present invention is related to a gasket for a timing chain tensioner of an internal combustion engine. The gasket includes a gasket body which is made of a monolithic piece of an elastomeric material. The gasket body has an oil opening for allowing oil to pass between the timing chain tensioner and a cylinder head. The gasket body includes at least one outer engagement feature for directly engaging with an outer wall of the timing chain tensioner to hold the gasket body on the timing chain tensioner. The gasket body also includes at least one inner engagement feature for directly engaging with an inner wall of the timing chain tensioner to further hold the gasket body on the timing chain tensioner.

The gasket is able to be quickly and easily attached with a previously used but still functional timing chain tensioner, thereby allowing the timing chain tensioner to be repaired without full replacement, as is previously required. This drastically reduces the cost to a customer who has a faulty timing chain tensioner sealing device since the gasket alone can be made at a substantially lower cost than a new timing chain tensioner with its own sealing device.

According to another aspect of the present invention, the at least one outer engagement feature is a lip which extends away from the oil opening and is generally L-shaped to engage with the outer wall of the timing chain tensioner.

According to yet another aspect of the present invention, the at least one inner engagement feature is further defined as a plurality of inner engagement features which are spaced apart from one another.

According to still another aspect of the present invention, the plurality of inner engagement features is further defined as four inner engagement features.

According to a further aspect of the present invention, two of the plurality of inner engagement features are spaced apart from one another by a slit which is shaped to receive a cross-beam that is located in an oil passage of the timing chain tensioner.

According to yet a further aspect of the present invention, that at least one inner engagement feature is an area of the gasket with an increased thickness for extending into an oil passage of the timing chain tensioner to directly engage the inner wall of the timing chain tensioner.

Another aspect of the present invention is related to a timing chain tensioner assembly. The timing chain tensioner assembly includes a housing that has an inner wall, which surrounds an oil passage, and has an outer wall. A plunger is partially received in the housing and is moveable relative to the housing in response to oil pressure at the oil passage. The assembly also includes a gasket, which is made of a monolithic piece of an elastomeric material. The gasket has at least one outer engagement feature which is in direct contact with the outer wall of the housing for retaining the gasket in engagement with the housing. The gasket also has at least one inner engagement feature which is in direct contact with the inner wall of the housing to further retain the gasket in engagement with the housing.

According to another aspect of the present invention, the at least one outer engagement feature of the gasket is an L-shaped lip which extends away from the oil opening.

According to yet another aspect of the present invention, the at least one inner engagement feature is further defined as a plurality of inner engagement features.

According to still another aspect of the present invention, the inner engagement features of the gasket are areas with an increased thickness such that the inner engagement features extend into the oil passage of the housing to directly engage the inner wall.

According to a further aspect of the present invention, the gasket includes a slit between two of the inner engagement features, a cross-beam in the oil passage of the housing is received in the slit, and the inner engagement features that are separated from one another by the slit are in direct engagement with the cross-beam.

Yet another aspect of the present invention is related to a method of repairing a timing chain tensioner assembly. The method includes the step of preparing a previously used timing chain tensioner that includes a housing with an outer wall and an inner wall that surrounds an oil passage. The method continues with the step of removing a bead of silicon rubber from the housing. The method proceeds with the step of preparing a gasket, which is made of a monolithic piece of an elastomeric material, which includes an oil opening, and which includes at least one outer engagement feature. The method continues with the step of directly engaging the at least one inner engagement feature of the gasket with the inner wall of the housing to further retain the gasket on the housing. The method proceeds with the step of directly engaging the outer engagement feature of the gasket with the outer wall of the housing to retain the gasket on the housing.

According to another aspect of the present invention, the at least one outer engagement feature is an L-shaped lip.

According to yet another aspect of the present invention, the at least one inner engagement feature is a plurality of inner engagement features which are spaced apart from one another.

According to still another aspect of the present invention, the plurality of inner engagement features are areas of the gasket with an increased thickness and wherein the step of directly engaging the inner engagement features with the inner wall of the housing includes inserting the inner engagement features into the oil passage of the housing.

BRIEF DESCRIPTION OF THE DRAWINGS

These and other features and advantages of the invention will become more readily appreciated when considered in connection with the following description of the presently preferred embodiments, appended claims and accompanying drawings, in which:

FIG. 3 is a bottom elevation view of a gasket for the timing chain tensioner of FIG. 2;

FIG. 4 is a side elevation view of the gasket of FIG. 3;

FIG. 5 is a front elevation view of the gasket of FIG. 3;

DESCRIPTION OF THE ENABLING EMBODIMENT

Referring to the Figures, wherein like numerals indicate corresponding parts throughout the several views, one aspect of the present invention is related to a timing chain tensioner assembly 20 for use with an internal combustion engine. As discussed in further detail below, the assembly 20 includes a previously used, but still functional timing chain tensioner 22 and a new gasket 24 (or gasket body) which can be quickly and easily attached with the timing chain tensioner 22.

Figure 2:
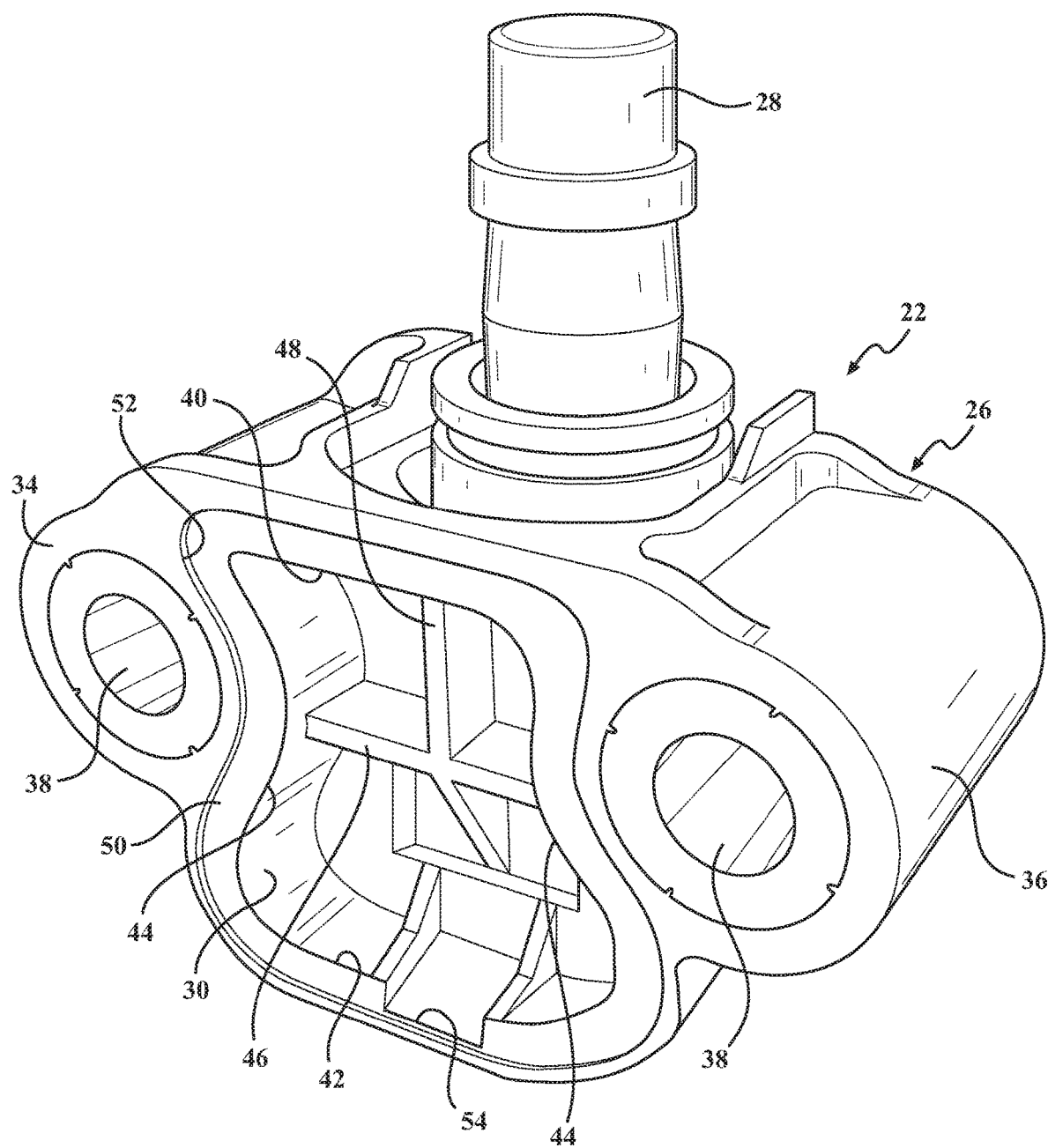
FIG. 2 is a perspective view of the previously used timing chain tensioner with the RTV sealing bead removed.

As shown in FIG. 2, the timing chain tensioner 22 includes a housing 26 (tensioner body) and a plunger 28 which is partially received in the housing 26 and projects out of the housing 26. The housing 26 also presents an inner wall 30 which surrounds an oil passage for receiving oil from and conveying the oil back to a cylinder head (not shown). During operation, oil pressure is applied to the oil passage between the cylinder head and the housing 26, thereby maintaining an outward force of the plunger 28 on the engine timing chain (not shown).

The housing 26 has a mating surface 34 and an outer wall 36 which has a top surface (through which the plunger projects), and a bottom surface. The mating surface 34 is configured to be engaged with the cylinder head when the timing chain tensioner 22 is installed on the internal combustion engine. A pair of spaced apart through holes 38 open to the mating surface for receiving fasters, such as bolts (not shown), for attaching the timing chain tensioner 22 with the cylinder head.

The oil passage opens to the mating surface 34 in the space between the fastener holes 38. As shown, in the exemplary embodiment, the oil passage has a generally linear top 40 and a generally linear bottom 42 and a pair of concavely curved sides 44 which generally follow the shapes of the fastener holes 38. Thus, the oil passage is wider adjacent its top 40 and bottom 42 than it is in a middle region between the top 40 and bottom 42.

The housing also has a pair of cross-beams 46, 48 that are located within the oil passage and that divide the oil passage into a plurality of chambers. Specifically, a first cross-beam 46 extends in a width-wise direction between the concavely curved sides 44, and a second cross-beam 48 extends perpendicularly to the first cross-beam from the top of the oil opening to the first cross-beam 46. The first and second cross-beams 46, 48 are set back from (i.e., not flush with) the mating surface.

The housing 26 also has a recessed surface 50 and a shoulder 52 that fully surround the oil opening. The recessed surface 50 is set back in the housing 26 relative to the mating surface 34, and the shoulder 52 extends between the mating surface 34 and the recessed surface 50. The recessed surface 50 has a thin portion 54, which is located at the bottom 42 of the oil opening and which has a reduced width as compared to the remainder of the recessed surface 50.

Figure 1:
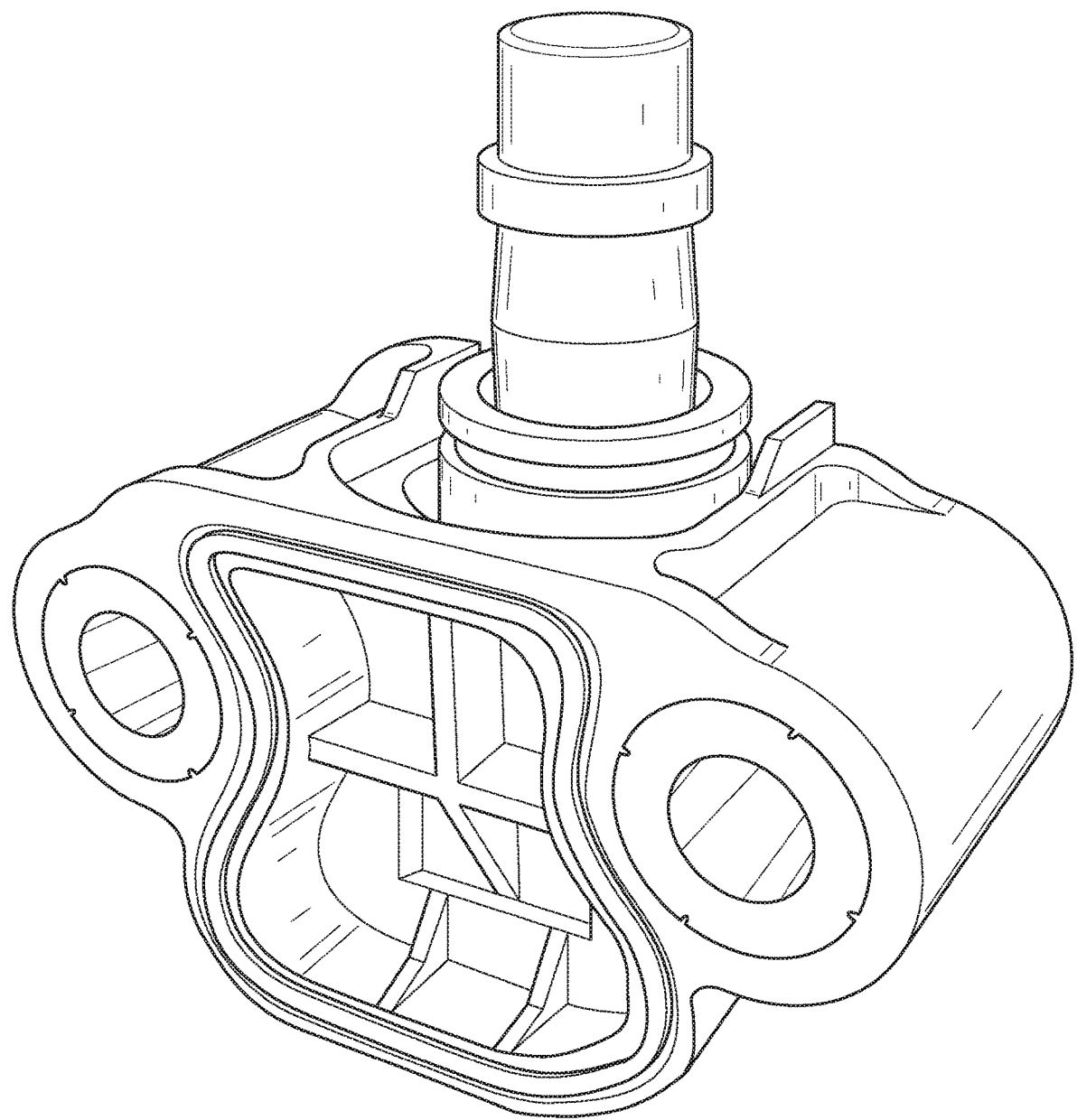
FIG. 1 is a perspective view of a timing chain tensioner assembly including an RTV sealing bead applied to a previously used timing chain tensioner.

Referring still to FIG. 1 but now additionally to FIGS. 3-5, the gasket 24 is made of a single, monolithic piece of an elastomeric material (such as rubber) and has an outer periphery which generally approximates the shape of the oil passage. The gasket 24 has an outer face 56 which is generally planar for sealing against the cylinder head and has an inner face for sealing against the housing 26.

The inner face of the gasket 24 has an outer portion 58 which is shaped similarly to and in direct contact with the recessed surface 50 of the housing 26. The outer portion 58 has a thickness which is greater than the height of the shoulder 52 of the housing 26 such that, when installed on the housing 26 but before the timing chain tensioner 22 is installed on the cylinder head, the outer portion 58 projects past the mating surface 24. Thus, when the timing chain tensioner 22 is bolted onto the cylinder head, the outer portion 58 of the gasket 24 is elastically compressed to establish a fluid tight seal around the oil passage. The elastic properties of the gasket material also allows the timing chain tensioner 22 to be detached from and re-attached to the cylinder head without compromising the performance of the gasket 24. The gasket 24 is preferably made through an injection molding operation.

The gasket 24 has both outer and inner engagement features 60, 62 which allow the gasket 24 to be very quickly and reliably installed on the housing 26 of the timing chain tensioner 22 and establish a strong connection between these components until the timing chain tensioner 22 is installed on the cylinder head.

The outer engagement feature 60 is a lip which is generally L-shaped. The L-shaped lip has a first leg that crosses over the mating surface 34 of the housing 26 below the bottom 42 of the oil passage and a second leg which extends perpendicularly to the first leg to directly engage the outer wall 36 of the housing 26. The outer engagement feature 26 extends over the thin region 54 of the recessed surface 50.

Each of the inner engagement features 62 has a greater thickness than the outer portion 58 of the gasket 24, and thus, when the gasket 24 is installed on the housing 26, the inner engagement features 62 extend partially into the oil passage. The inner engagement features 62 are shaped to directly contact the inner wall 30 of the housing 26.

When the gasket 24 is installed on the housing 26 of the timing chain tensioner 22, friction between the inner engagement features 62 and the inner wall 30 of the housing 26 and friction between the outer engagement feature 60 and the outer wall 36 of the housing 26 maintains the gasket 24 in its prescribed place on the housing 26.

Figure 6:
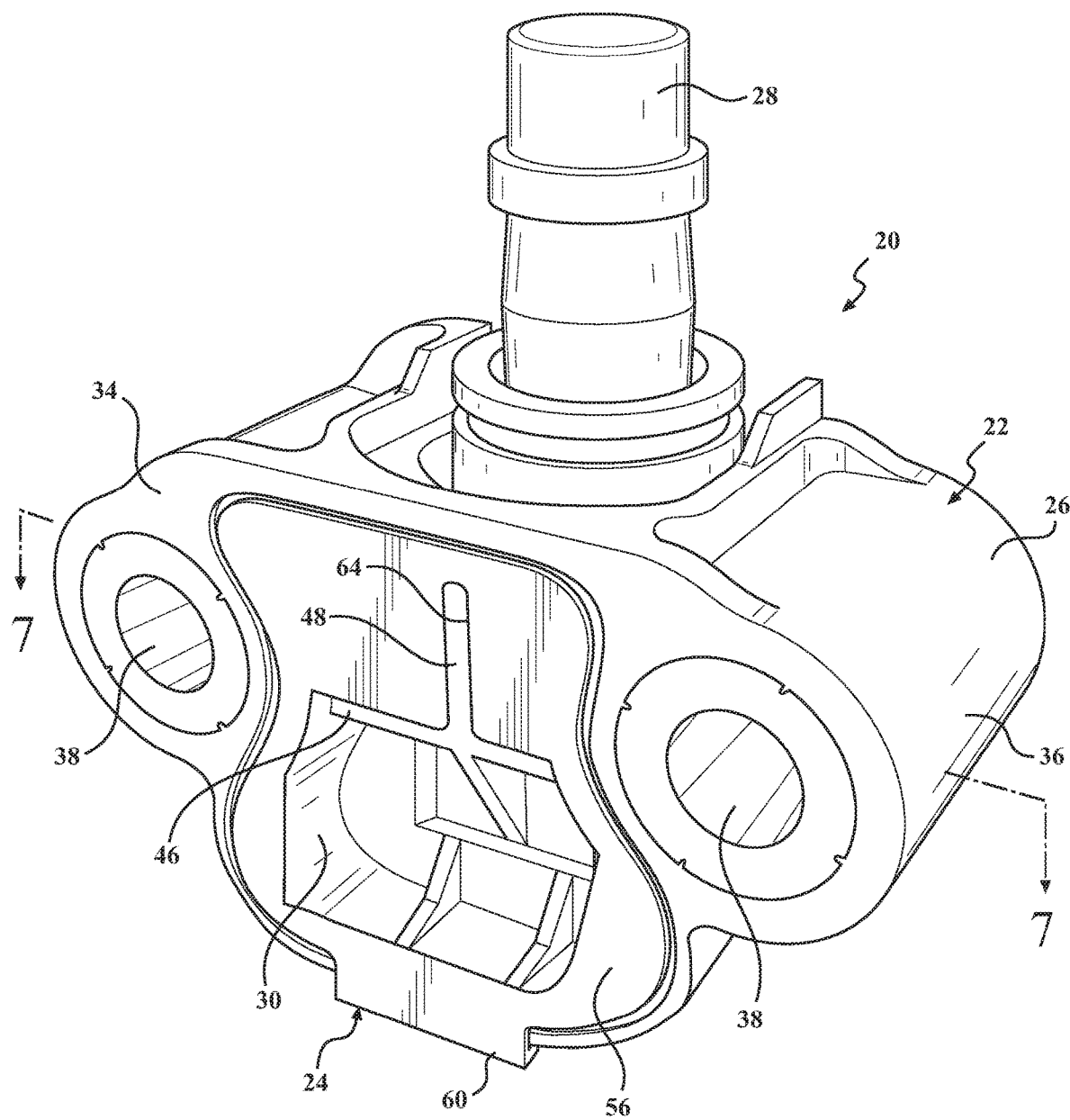
FIG. 6 is a perspective view of the gasket of FIGS. 3-5 as installed on the timing chain tensioner of FIG. 2.
Figure 7:
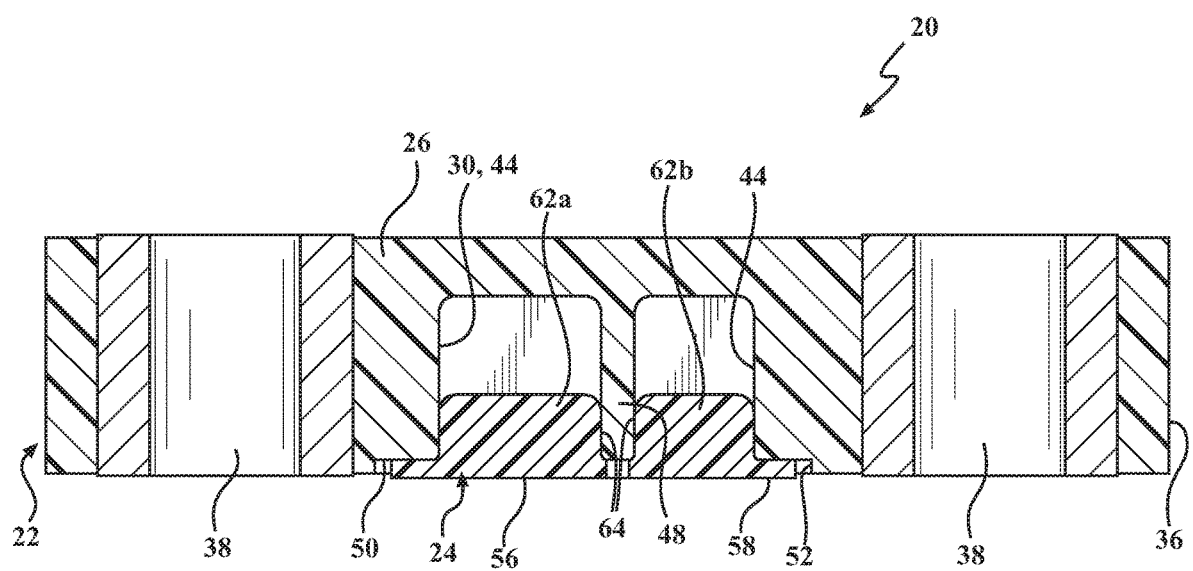
FIG. 7 is a cross-sectional view of the timing chain tensioner and gasket of FIG. 6 taken through Line 7-7.

In the exemplary embodiment, the gasket 24 includes four total inner engagement features 62a-d with two of the inner engagement features 62a, 62b extending into the chambers of the oil passage above the first cross-beam 46 and the other two inner engagement features 62c, 62d extending into the chambers below the first cross-beam 46. The inner engagement features 62a, 62b are spaced apart from one another by a slot 64. As shown in FIGS. 6 and 7, when the gasket 24 is installed on the housing 26, the second cross-beam 48 is received in the slot 64 such that, in addition to the inner wall 30, these inner engagement features 62a, 62b also are in direct contact with both of the first and second cross-beams 46, 48 to further improve the connection between the housing 26 and the gasket 24. The other two inner engagement features 26c, 26d are in engagement with the outermost portions of the inner wall 30 below the first cross-beam 46.

With the exception of the outer engagement feature 60, the outer periphery of the gasket 24 is spaced inwardly from the shoulder 52 that separates the mating and recessed surfaces 34, 50 of the housing 26. Thus, the gasket 24 has room to expand outwardly when it is compressed between the housing 26 and the cylinder head. Also, the oil opening of the gasket 24 is smaller than the oil passage (shown in FIG. 1) of the housing 26, but this smaller size has been found to not affect the performance of the timing chain tensioner 22.

Another aspect of the present invention is a method of repairing a previously used timing chain tensioner assembly, such as the timing chain tensioner assembly shown in FIG. 1. To repair the timing chain tensioner assembly, a user first removes the bead of silicon rubber from the recessed surface. Once the silicon rubber is removed, then the user aligns the gasket 24 with the oil passage of the housing 26 and inserts the inner engagement features 62 into place. As the inner engagement features 62 are inserted into the oil passage, the outer engagement feature 60 will also engage itself with the outer wall 36 of the housing 26. Due to the asymmetrical shapes of the oil passage and the gasket 24, the gasket 24 can only be inserted into the oil passage in one way, i.e., misinstallation is very difficult if not possible. The timing chain tensioner 22 can then be bolted into place on the engine and re-used.

Obviously, many modifications and variations of the present invention are possible in light of the above teachings and may be practiced otherwise than as specifically described while within the scope of the appended claims. It is to be understood that the directional terms, such as "top", "bottom", "upper", and "lower" are in reference to the orientation of the structure of the exemplary embodiment in one or more of the Figures and is not intended to require any specific orientation. Additionally, it is to be understood that all features of all claims and all embodiments can be combined with each other as long as they do not contradict each other.

What is claimed is:

1. A gasket for a timing chain tensioner of an internal combustion engine, comprising:
    a gasket body made of a monolithic piece of an elastomeric material;
    said gasket body having an oil opening for allowing oil to pass between the timing chain tensioner and a cylinder head;
    said gasket body including at least one outer engagement feature for directly engaging with an outer wall of the timing chain tensioner to hold said gasket body on the timing chain tensioner; and
    said gasket body including a plurality of inner engagement features which are spaced apart from one another for directly engaging with an inner wall of the timing chain tensioner to further hold said gasket body on the timing chain tensioner;
    wherein two of said plurality of inner engagement features are spaced apart from one another by a slit which is shaped to receive a cross-beam that is located in an oil passage of the timing chain tensioner.

2. The gasket as set forth in claim 1 wherein said at least one outer engagement feature is a lip which extends away from said oil opening and is generally L-shaped to engage with the outer wall of the timing chain tensioner.

3. The gasket as set forth in claim 1 wherein said plurality of inner engagement features is further defined as four inner engagement features.

4. The gasket as set forth in claim 1 wherein said at least one inner engagement feature is an area of said gasket with an increased thickness for extending into an oil passage of the timing chain tensioner to directly engage the inner wall of the timing chain tensioner.

5. A timing chain tensioner assembly, comprising:
    a housing having an inner wall which surrounds an oil passage and having an outer wall;
    a plunger partially received in said housing and moveable relative to said housing in response to oil pressure at said oil passage;
    a gasket made of a monolithic piece of an elastomeric material;
    said gasket surrounding said oil passage and having an oil opening;
    said gasket including at least one outer engagement feature which is in direct contact with said outer wall of said housing for retaining said gasket in engagement with said housing; and
    said gasket further including a plurality of inner engagement features, at least one inner engagement feature of said plurality of inner engagement features which is in direct contact with said inner wall of said housing to further retain said gasket in engagement with said housing;
    wherein said inner engagement features of said gasket are areas of said gasket with an increased thickness which extend into said oil passage of said housing to directly engage said inner wall;
    wherein said gasket includes a slit between two of said inner engagement features and wherein a cross-beam in said oil passage of said housing is received in said slit and wherein said inner engagement features which are separated from one another by said slit are in direct engagement with said cross-beam.

6. The timing chain tensioner assembly as set forth in claim 5 wherein said at least one outer engagement feature of said gasket is an L-shaped lip which extends away from said oil opening.

* * * * *